United States Patent
Kim et al.

(10) Patent No.: US 10,564,822 B2
(45) Date of Patent: Feb. 18, 2020

(54) ELECTRONIC DEVICE FOR REDUCING BURN-IN AND COMPUTER-READABLE RECORDING MEDIUM

(71) Applicant: Samsung Electronics Co., Ltd., Gyeonggi-do (KR)

(72) Inventors: Hwi-Woong Kim, Suwon-si (KR); Yun-Jeong Kang, Gyeonggi-do (KR); Kyoung-Ryoul Kim, Gyeonggi-do (KR); Go-Un Lee, Seoul (KR); Dae-Hwan Kim, Gyeonggi-do (KR); Keon-Young Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 205 days.

(21) Appl. No.: 15/687,689

(22) Filed: Aug. 28, 2017

(65) Prior Publication Data
US 2018/0059911 A1 Mar. 1, 2018

(30) Foreign Application Priority Data
Aug. 29, 2016 (KR) .................. 10-2016-0110060

(51) Int. Cl.
| H04N 5/445 | (2011.01) |
| G06F 3/14 | (2006.01) |
| H04N 3/20 | (2006.01) |
| G09G 3/32 | (2016.01) |
| G06F 3/0484 | (2013.01) |

(Continued)

(52) U.S. Cl.
CPC ........ G06F 3/04842 (2013.01); G06F 3/0481 (2013.01); G09G 5/14 (2013.01); *G06F 2203/04803* (2013.01); *G06F 2203/04804* (2013.01); *G09G 2320/046* (2013.01); *G09G 2354/00* (2013.01)

(58) Field of Classification Search
CPC .......... G09G 2320/046; G09G 2354/00; G06F 3/0481; G06F 3/0482
See application file for complete search history.

(56) References Cited

U.S. PATENT DOCUMENTS

| 5,390,295 A * | 2/1995 | Bates .................... G06F 3/0481 714/E11.188 |
| 7,418,668 B2 | 8/2008 | Lindsay et al. |
| 8,443,297 B1 | 5/2013 | Jitkoff et al. |

(Continued)

FOREIGN PATENT DOCUMENTS

| KR | 10-2012-0106558 A | 9/2012 |
| KR | 10-1336619 B1 | 12/2013 |
| KR | 10-1507866 B1 | 4/2015 |

*Primary Examiner* — Jordany Nunez
(74) *Attorney, Agent, or Firm* — Cha & Reiter, LLC.

(57) ABSTRACT

Disclosed is an electronic device and method for reducing burn-in on a display. The electronic device may include a display and a processor. The processor implements the method, including controlling the display to display a background screen and one or more windows on the background screen, confirming a location of a first window when the first window is selected by a user from among the one or more windows, generating a blurred window border to be applied to the first window based on the selection of the first window, and controlling the display to display the blurred window border along a boundary of the first window.

18 Claims, 16 Drawing Sheets

(51) Int. Cl.
*G06F 3/0481* (2013.01)
*G09G 5/14* (2006.01)

(56) References Cited

U.S. PATENT DOCUMENTS

| | | | | |
|---|---|---|---|---|
| 2002/0171682 | A1* | 11/2002 | Frank | G06F 3/0481 |
| | | | | 715/790 |
| 2004/0196373 | A1* | 10/2004 | Okano | G09G 3/007 |
| | | | | 348/173 |
| 2005/0039146 | A1* | 2/2005 | Jones | G06F 3/0481 |
| | | | | 715/856 |
| 2005/0157171 | A1* | 7/2005 | Bowser | G09G 3/007 |
| | | | | 348/174 |
| 2005/0195280 | A1* | 9/2005 | Murakami | G09G 3/007 |
| | | | | 348/173 |
| 2006/0132653 | A1* | 6/2006 | Higashi | H04N 5/70 |
| | | | | 348/556 |
| 2007/0109284 | A1* | 5/2007 | Yamazaki | G09G 3/20 |
| | | | | 345/204 |
| 2008/0307352 | A1* | 12/2008 | Chaudhri | G06F 3/048 |
| | | | | 715/788 |
| 2010/0060789 | A1* | 3/2010 | Aoki | G09G 5/14 |
| | | | | 348/563 |
| 2012/0236040 | A1 | 9/2012 | Eom et al. | |
| 2015/0040062 | A1* | 2/2015 | Hollis | G06F 3/1423 |
| | | | | 715/800 |
| 2015/0339980 | A1 | 11/2015 | Yamazaki et al. | |
| 2016/0125777 | A1* | 5/2016 | Knepper | G09G 3/007 |
| | | | | 345/611 |

* cited by examiner

US 10,564,822 B2

ELECTRONIC DEVICE FOR REDUCING BURN-IN AND COMPUTER-READABLE RECORDING MEDIUM

CLAIM OF PRIORITY

This application claims the priority under 35 U.S.C. § 119(a) to Korean Application Serial No. 10-2016-0110060, which was filed in the Korean Intellectual Property Office on Aug. 29, 2016, the entire content of which is hereby incorporated by reference.

TECHNICAL FIELD

The present disclosure relates to an electronic device for reducing display burn-in and a computer-readable recording medium. More particularly, the present disclosure relates to an electronic device for changing at least part of a screen displayed on a display and reducing burn-in.

BACKGROUND

Recently, various types of display apparatuses are used to display images. For example, research has been performed on and use has been made of various display apparatuses, such as a Liquid Crystal Display Device (LCD), a Plasma Display Panel (PDP), an Electro-Luminescent Display (ELD), a Vacuum Fluorescent Display (VFD), an Organic Light-Emitting Diode (OLED) display, and the like.

SUMMARY

When an identical screen is continuously displayed without change on a display of an electronic device, or when a sharp contrast exists between colors on a displayed screen, screen 'burn-in' may occur, which creates transient image persistence (or 'image-sticking') in the display.

Also, R, G, and B light-emitting elements of an OLED display have respective lifespans, and thus, according to the use of the OLED display, the lifespan thereof is reduced and burn-in may occur.

In order to solve the above-described problems or other problems, various embodiments of the present disclosure can provide a method and an apparatus for reducing burn-in.

In accordance with an aspect of the present disclosure, an electronic device for reducing burn-in on a display is provided. The electronic device may include a display and a processor operatively coupled to the display. The processor is configured to control the display to display a background screen and one or more windows on the background screen, confirm a location of a first window when the first window is selected by a user from among the one or more windows, generate a blurred window border to be applied to the first window based on the selection of the first window, and control the display to display the blurred window border along a boundary of the first window.

In accordance with another aspect of the present disclosure, a non-transitory computer-readable recording medium for recording a program executed by a computer is provided. In the non-transitory computer-readable recording medium, the program may include executable instructions that, when executed by a processor, may cause the processor to perform operations including: controlling a display to display a background screen and one or more windows on the background screen, confirming, by a processor, a location of a first window when the first window is selected by a user from among the one or more windows, generating a blurred window border to be applied to the first window based on the selection of the first window, and controlling the display to display the blurred window border along a boundary of the first window.

In accordance with still another aspect of the present disclosure, an electronic device for reducing burn-in on a display is provided. The electronic device may include a display, and a processor operatively coupled to the display, configured to: control the display to display a background screen and multiple windows on the background screen, confirm a location of a first window selected by a user input from among the multiple windows, apply blur-processing to a first area including a line designating a boundary of the first window, the boundary confirmed according to a location of the first window.

According to various embodiments of the present disclosure, the electronic device can prevent an identical screen from being continuously displayed on a display without a screen change and can prevent a sharp contrast from existing in a difference between colors on a screen, and thereby can reduce burn-in on the display.

BRIEF DESCRIPTION OF THE DRAWINGS

The above and other aspects and features of the present disclosure will be more apparent from the following detailed description taken in conjunction with the accompanying drawings, in which.

DETAILED DESCRIPTION

Figure 1:
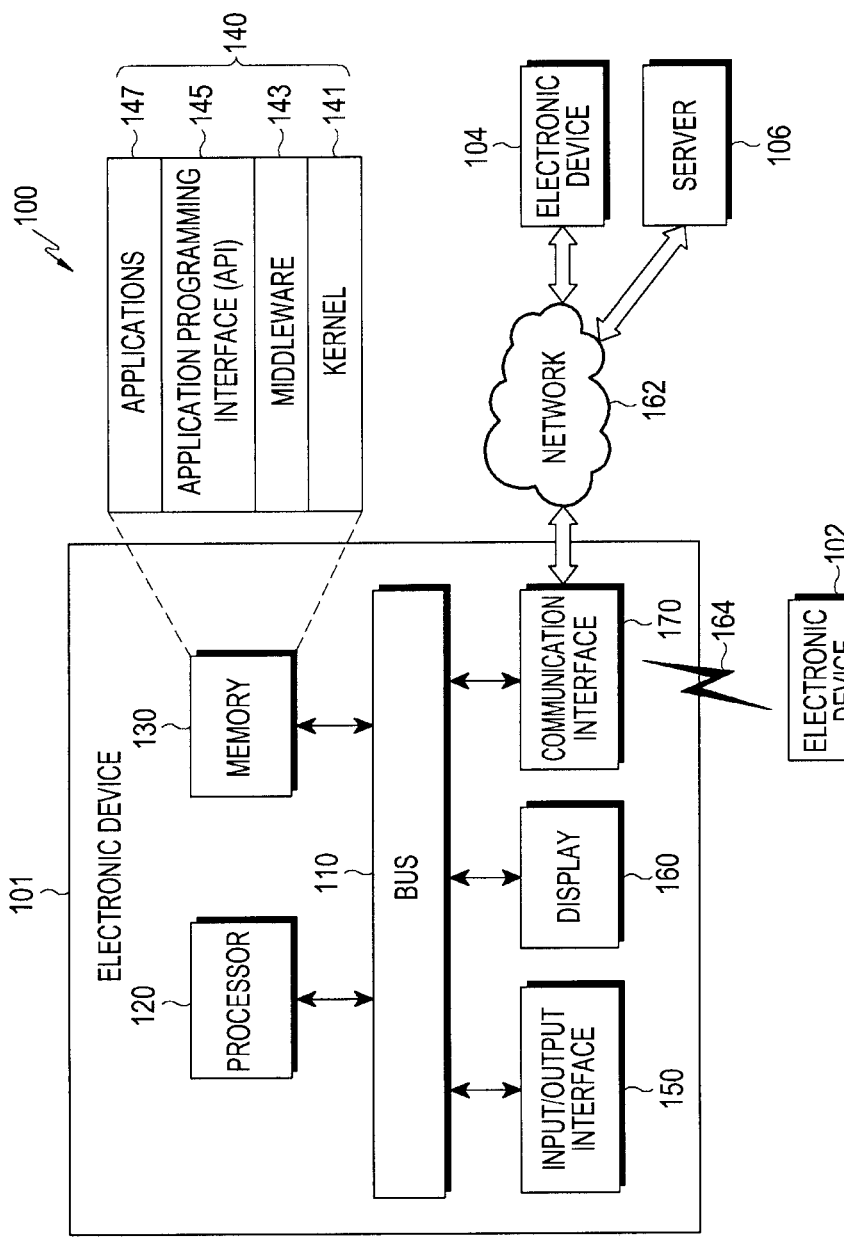
FIG. 1 is a view illustrating a network environment including an electronic device according to various embodiments of the present disclosure.

Hereinafter, various embodiments of the present disclosure will be described with reference to the accompanying drawings. It should be understood that the embodiments and the terms used herein are not intended to limit the present disclosure to the particular forms disclosed and the present disclosure is to cover various modifications, equivalents, and/or alternatives of the corresponding embodiments. In describing the drawings, similar reference numerals may be used to designate similar elements. As used herein, the singular forms may include the plural forms as well, unless the context clearly indicates otherwise. In the present disclosure, the expression "A or B" or "at least one of A and/or B" may include all possible combinations of the items listed. The expression "a first", "a second", "the first", or "the second" may modify corresponding elements regardless of the order or the importance, and is used only to distinguish one element from another element, but does not limit the corresponding elements. When an element (e.g., first element) is referred to as being (operatively or communicatively) "connected," or "coupled," to another element (e.g., second element), it may be directly connected or coupled directly to the other element or any other element (e.g., third element) may be interposed between them.

In the present disclosure, the expression "configured to" may be exchanged with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. According to various embodiments of the present disclosure, the wearable device may include at least one of an accessory type (e.g., a watch, a ring, a bracelet, an anklet, a necklace, glasses, a contact lens, or a Head-Mounted Device (HMD)), a fabric- or clothing-integrated type (e.g., an electronic clothing), a body-mounted type (e.g., a skin pad or tattoo), and a bio-implantable type (e.g., an implantable circuit). According to some embodiments of the present disclosure, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Navigation Satellite System (GNSS), an Event Data Recorder (EDR), a Flight Data Recorder (FDR), a vehicle infotainment device, electronic devices for a ship (e.g., a navigation device for a ship, a gyro-compass, etc.), avionics, security devices, an automotive head unit, a robot for home or industry, a drone, an Automatic Teller's Machine (ATM) in banks, Point Of Sales (POS) in a shop, and an Internet of Things device (e.g., a light bulb, various sensors, a sprinkler device, a fire alarm, a thermostat, a streetlamp, a toaster, sporting goods, a hot water tank, a heater, a boiler, etc.). According to some embodiments of the present disclosure, the electronic device may include at least one of a part of a piece of furniture, a building/structure, or a motor vehicle, an electronic board, an electronic signature receiving device, a projector, and various kinds of measuring instruments (e.g., a water meter, an electric meter, a gas meter, and a radio wave meter). In various embodiments of the present disclosure, the electronic device may be flexible, or may be a combination of two or more of the aforementioned various devices. The electronic device according to an embodiment of the present disclosure is not limited to the aforementioned devices. In the present disclosure, the term "user" may indicate a person using an electronic device or a device (e.g. an artificial intelligence electronic device) using an electronic device.

An electronic device 101 within a network environment 100 according to various embodiments of the present disclosure will be described with reference to FIG. 1. The electronic device 101 may include a bus 110, a processor 120, a memory 130, an input/output interface 150, a display 160, and a communication interface 170. In some embodiments of the present disclosure, at least one of the above elements of the electronic device 101 may be omitted from the electronic device 101, or the electronic device 101 may additionally include other elements. The bus 110 may include a circuit that interconnects the elements 110 to 170 and delivers a communication (e.g., a control message or data) between the elements 110 to 170. The processor 120 may include one or more of a CPU, an AP, and a Communication Processor (CP). The processor 120 may perform, for example, calculations or data processing related to control over and/or communication by at least one of the other elements of the electronic device 101.

The memory 130 may include a volatile memory and/or a non-volatile memory. The memory 130 may store, for example, commands or data related to at least one of the other elements of the electronic device 101. According to an embodiment of the present disclosure, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an "Operating System (OS)." For example, the kernel 141 may control or manage system resources (e.g., the bus 110, the processor 120, the memory 130, etc.)

used to execute operations or functions implemented by the other programs (e.g., the middleware 143, the API 145, and the application program 147). Also, the kernel 141 may provide an interface capable of controlling or managing the system resources by accessing the individual elements of the electronic device 101 by using the middleware 143, the API 145, or the application program 147.

For example, the middleware 143 may serve as an intermediary that enables the API 145 or the application program 147 to communicate with the kernel 141 and to exchange data therewith. Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic device 101, to at least one of the application programs 147, and may process the one or more task requests according to the assigned priority. The API 145 is an interface through which the application 147 controls a function provided by the kernel 141 or the middleware 143, and may include, for example, at least one interface or function (e.g., command) for file control, window control, image processing, character control, or the like. For example, the input/output interface 150 may deliver a command or data, which is input from a user or another external device, to the element(s) other than the input/output interface 150 within the electronic device 101, or may output, to the user or another external device, commands or data received from the element(s) other than the input/output interface 150 within the electronic device 101.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. For example, the display 160 may display various pieces of content (e.g., text, images, videos, icons, symbols, and/or the like.) to the user. The display 160 may include a touch screen, and may receive, for example, a touch input, a gesture input, a proximity input, or a hovering input provided by an electronic pen or a body part of the user. The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication and may communicate with the external device (e.g., the second external electronic device 104 or the server 106).

The types of the wireless communication may include, for example, cellular communication which uses at least one of Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM). According to an embodiment of the present disclosure, the types of the wireless communication may include at least one of, for example, Wi-Fi, Bluetooth, Bluetooth Low Energy (BLE), ZigBee, Near Field Communication (NFC), magnetic secure transmission, Radio Frequency (RF), and Body Area Network (BAN). According to an embodiment of the present disclosure, the types of the wireless communication may include a GNSS. The GNSS may be, for example, a Global Positioning System (GPS), a Global Navigation Satellite System (Glonass), a Beidou Navigation Satellite System (hereinafter "Beidou"), or a European Global Satellite-based Navigation System (Galileo). Hereinafter, in the present disclosure, the term "GPS" may be used interchangeably with the term "GNSS." The types of the wired communication may include at least one of, for example, a Universal Serial Bus (USB), a High Definition Multimedia Interface (HDMI), Recommended Standard 232 (RS-232), Power Line communication (PLC), and a Plain Old Telephone Service (POTS). Examples of the network 162 may include at least one of telecommunication networks, such as a computer network (e.g., a Local Area Network (LAN), or a Wide Area Network (WAN)), the Internet, and a telephone network.

Each of the first and second external electronic devices 102 and 104 may be of a type identical to or different from that of the electronic device 101. According to various embodiments of the present disclosure, all or some of operations performed by the electronic device 101 may be performed by another electronic device or multiple electronic devices (e.g., the first and second external electronic devices 102 and 104 or the server 106). According to an embodiment of the present disclosure, when the electronic device 101 needs to perform some functions or services automatically or by a request, the electronic device 101 may send, to another device (e.g., the first external electronic device 102, the second external electronic device 104, or the server 106), a request for performing at least some functions related to the functions or services, instead of performing the functions or services by itself, or additionally. Another electronic device (e.g., the first external electronic device 102, the second external electronic device 104, or the server 106) may execute the requested functions or the additional functions, and may deliver a result of the execution to the electronic device 101. The electronic device 101 may process the received result without any change or additionally and may provide the requested functions or services. To this end, use may be made of, for example, cloud computing technology, distributed computing technology, or client-server computing technology.

According to various embodiments of the present disclosure, the display 160 may display a background screen. For example, the background screen may be a wallpaper displayed as a background, a wallpaper, and the like. Also, the background screen may be screens identically or differently displayed on multiple pages of a home screen or the like, or may be displayed as one screen across all of the multiple pages thereof.

Also, the display 160 may display at least one window on the background screen. In the following description, a window may be a predetermined area for outputting information according to the execution of a function of the electronic device 101. In the present example, the information may include various screen elements related to the execution of a function of the electronic device 101. For example, the information may include at least one of various items, such as text, a still or moving image, an image, an icon, a virtual key button, a slide bar, a progressing bar, a list item, a thumbnail item, and the like.

According to an embodiment of the present disclosure, a window may be output in the form of a new layer on the background screen. Also, when multiple windows are displayed on the display 160, the processor 120 may divide an upper layer area of the background screen, and may output the multiple respective windows in the divided partial layer areas. Also, in a state of outputting a single window, the processor 120 may push up a partial area of the single window or may adjust the location or size thereof and may output another window in response to the above-described operation, and thereby may display multiple windows on the display 160. As described above, a window represents an area for displaying information according to the execution of a particular function by the electronic device, and is not limited to the name "window". Accordingly, the window may be understood as being various terms, such as an information display area, an information display layer, a pop-up, a player, a screen, and the like according to the execution of a function by the electronic device 101.

According to various embodiments of the present disclosure, the processor 120 may confirm the location of a first window that a user has selected from among one or more windows displayed on the display 160. For example, when the first window is quadrangular, the processor 120 may confirm the location of the first window with coordinates of a left upper end vertex of the first window as a reference. However, this configuration is an example for illustrative purposes only, and various methods for confirming the location of the first window may be applied.

Also, the processor 120 may determine whether an input has been received from a user, and may confirm the location of the first window when the input has not been received from the user within a preset time period. Before the processor 120 performs a method for reducing the occurrence of burn-in, the processor 120 may determine whether an input has been received from the user within a preset time period, in order to determine whether the user is using the electronic device 101. When the user uses the electronic device 101, the execution of the method for reducing the occurrence of burn-in may inconvenience the user, and thus, the electronic device 101 may determine whether the user is using the electronic device 101. However, according to a configuration and the like made by the user, before the processor 120 performs the method for reducing the occurrence of burn-in, the processor 120 may not determine whether the user is using the electronic device 101. In this case, the processor 120 may confirm the location of the first window regardless of whether an input has been received from the user.

According to various embodiments of the present disclosure, the processor 120 may generate at least one first blurred window for displaying a blur-processed image, on the basis of the confirmed location of the first window. For example, the at least one first blurred window may include a blur-processed image in order to reduce a color or brightness difference or the like between screens displayed through a background screen and the first window displayed on the display 160.

In the present example, the blur-processing of an image is to intentionally degrade the quality (or definition) of an image and to cause the user to recognize that the image is blurred.

The processor 120 may blur-process a preset image at an identical blurring level regardless of a visual difference (e.g. a color or brightness difference, etc.) between screens displayed through the background screen and the first window, or may adjust a blurring level in response to the difference between the screens displayed through the background screen and the first window and may blur-process the preset image. For example, the processor 120 may determine a blurring level on the basis of a visual difference between screens displayed through the background screen and the first window, and may blur-process a preset image according to the determined blurring level.

The processor 120 may confirm a boundary line of the first window on the basis of the location of the first window. For example, when the first window is quadrangular, the processor 120 may confirm coordinates of the remaining vertices with coordinates of a left upper end vertex of the first window as a reference, and may confirm the location and length of the boundary line of the first window on the basis of the confirmed coordinates of the remaining vertices.

The processor 120 may generate at least one first blurred window corresponding to the confirmed boundary line of the first window. The processor 120 may generate multiple first blurred windows according to the shape of the first window, or may generate one first blurred window corresponding to the entire boundary line of the first window.

The processor 120 may generate at least one first blurred window so as to have an identical size regardless of a difference between screens displayed through the background screen and the first window, or may adjust the size of at least one first blurred window generated according to the difference between the screens displayed through the background screen and the first window. For example, the processor 120 may determine the size of the at least one first blurred window generated according to the difference between the screens displayed through the background screen and the first window, and may generate the at least one first blurred window so as to have the determined size. Also, when multiple first blurred windows are generated, the multiple first blurred windows may be generated to all have an identical size, or may be generated to have different sizes according to at least one of the shape of the first window and a difference between a background screen in areas where the multiple respective first blurred windows are to be displayed and a screen displayed through the first window. A specific method for generating a first blurred window will be described below.

Also, for convenience of description, the entire first window has been described as being displayed on a background screen, but embodiments of the present disclosure are not limited thereto, and a partial area of the first window may be displayed to overlap a second window on the second window displayed on the display 160. In this case, the processor 120 may display a blur-processed image through at least one first blurred window in order to reduce a color or brightness difference and the like between a screen displayed through the first window and a screen displayed through the second window. Further, in order to determine a blurring level and the size of the first blurred window, use may be made of not only a difference between screens displayed through the background screen and the first window, but also a difference between screens displayed through the first and second windows.

According to various embodiments of the present disclosure, the processor 120 may display the generated at least one first blurred window on a boundary line of the first window. For example, the processor 120 may divide an upper layer area of the first window, and may output the at least one first blurred window in the divided partial layer areas. Accordingly, the processor 120 may display the at least one first blurred window so as to overlap the first window on the boundary line of the first window.

According to various embodiments of the present disclosure, after the processor 120 displays the at least one first blurred window on the boundary line of the first window, when an input is received from the user, the processor 120 may remove the at least one first blurred window displayed on the boundary line of the first window. When an input is received from the user, the processor 120 may determine that the user intends to use the electronic device 101 again, and may remove the at least one first blurred window displayed on the boundary line of the first window.

According to various embodiments of the present disclosure, the processor 120 may move, in each preset cycle, the location of the first window and that of the at least one first blurred window. In order to prevent an identical screen from being displayed without any change, the processor 120 may move, in each preset cycle based on expiry of a predetermined time, the location of the first window and that of the at least one first blurred window. The preset cycle is implemented by resetting a timer counting down the predetermined time after each movement. Movement directions and movement distances of the location of the first window and that of the at least one first blurred window may be set to be identical to each other.

According to various embodiments of the present disclosure, when a second window is displayed on the background screen on the display 160, the processor 120 may move the location of the second window in each preset cycle. In the present example, the second window may be a window that the user does not select from among multiple windows displayed on the display 160. In order to prevent an identical screen from being displayed without any change, the processor 120 may move the location of the second window in each preset cycle.

Also, the processor 120 may move, in each preset cycle, the remaining windows except for the first window that the user has selected from among the multiple displayed windows, or may move all the multiple windows in each preset cycle. In this case, at least one of a movement direction and a movement distance of the first window selected by the user may be different from at least one of a movement direction and a movement distance of each of the remaining windows.

Also, the processor 120 may generate at least one blurred window for each of all the multiple displayed windows, and may display the at least one blurred window generated on a boundary line of each of the multiple windows.

Further, the processor 120 may generate at least one first blurred window for the first window that the user has selected from among the multiple displayed windows, and may display the at least one first blurred window on a boundary line of the first window. In other words, the processor 120 may display the at least one first blurred window on the boundary line of the first window, and may not generate blurred windows for the remaining windows except for the first window among the multiple windows.

When, as described above, the processor 120 generates a blurred window for the window selected by the user, if a window selected according to a user input is changed, the existing blurred window may be removed, and a new blurred window may be generated and displayed for a newly-selected window.

For example, when a second window is selected, the processor 120 may confirm the location of the second window. Based on the location of the second window, the processor 120 may generate at least one second blurred window for displaying a blur-processed image, and may display the at least one second blurred window on a boundary line of the second window.

Also, as a window selected according to a user input is changed from the first window to the second window, the processor 120 may remove the at least one first blurred window displayed on the boundary line of the first window. The processor 120 may remove the first blurred window, and may then move, in each preset cycle, the first window together with the remaining windows except for the second window selected from among the multiple windows.

Figure 2:
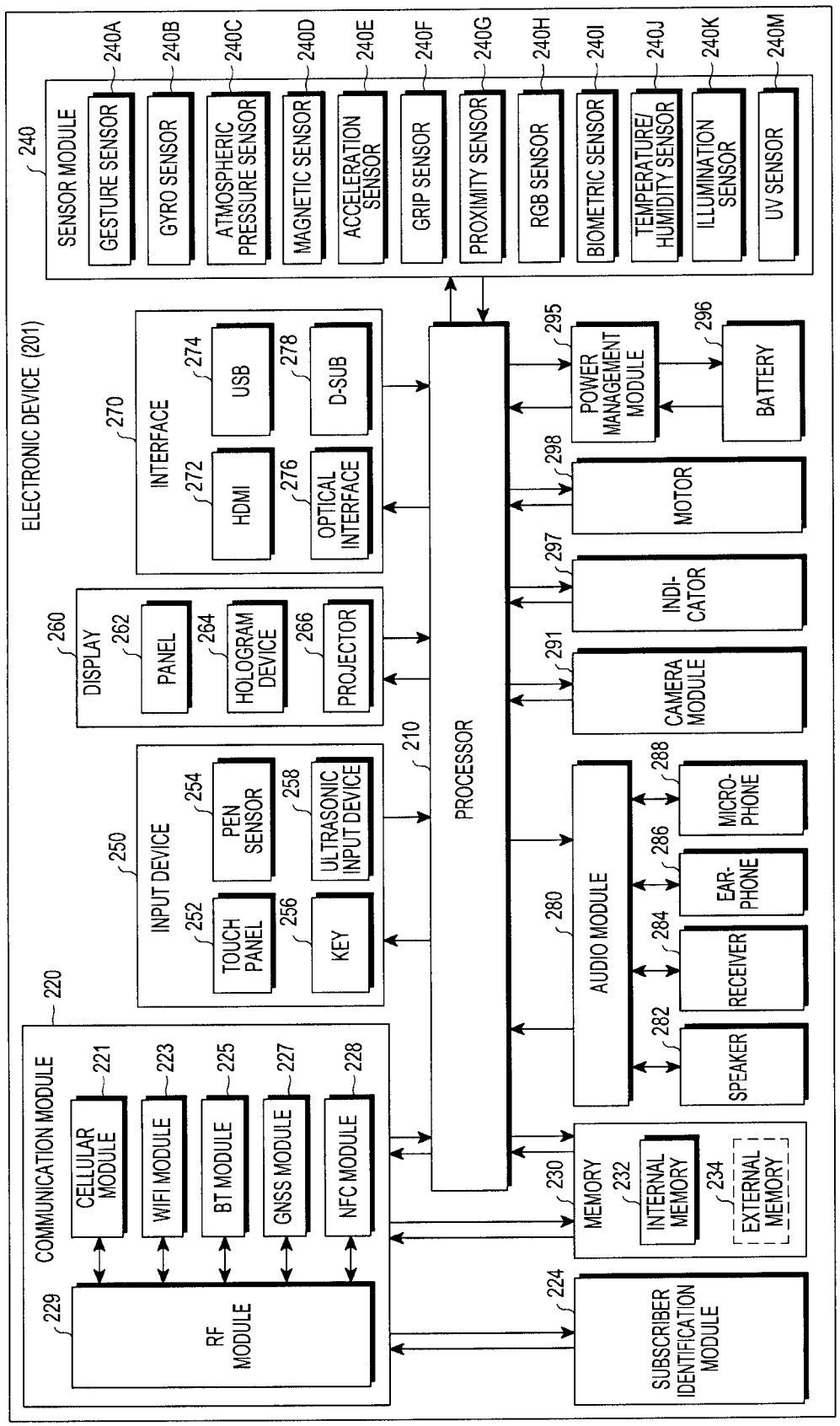
FIG. 2 is a block diagram illustrating a configuration of an electronic device according to various embodiments of the present disclosure.

FIG. 2 is a block diagram illustrating a configuration of an electronic device 201 according to various embodiments of the present disclosure. The electronic device 201 may include, for example, the whole or part of the electronic device 101 illustrated in FIG. 1. The electronic device 201 may include at least one processor (e.g., an application processor or 'AP') 210, a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298. The processor 210 may control multiple hardware or software elements connected to the processor 210 and may perform the processing of and arithmetic operations on various data, by running, for example, an OS or an application program. The processor 210 may be implemented by, for example, a System on Chip (SoC). According to an embodiment of the present disclosure, the processor 210 may further include a Graphics Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store the resulting data in a non-volatile memory.

The communication module 220 may have a configuration identical or similar to that of the communication interface 170. The communication module 220 may include, for example, the cellular module 221, a Wi-Fi module 223, a Bluetooth (BT) module 225, a GNSS module 227, an NFC module 228, and an RF module 229. For example, the cellular module 221 may provide a voice call, a video call, a text message service, an Internet service, and the like through a communication network. According to an embodiment of the present disclosure, the cellular module 221 may identify or authenticate the electronic device 201 in the communication network by using the subscriber identification module (e.g., a Subscriber Identity Module (SIM) card) 224. According to an embodiment of the present disclosure, the cellular module 221 may perform at least some of the functions that the processor 210 may provide. According to an embodiment of the present disclosure, the cellular module 221 may include a CP. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit and receive, for example, communication signals (e.g., RF signals). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module. The subscriber identification module 224 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, and a Solid State Drive (SSD)). The external memory 234 may include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red-Green-Blue (RGB) sensor), a biometric sensor 240I, a temperature/humidity sensor 240J, an illuminance sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input apparatus 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and a surface acoustic wave scheme. Also, the touch panel 252 may further include a control circuit. The touch panel 252 may further include a tactile layer and may provide a tactile reaction to the user. The (digital) pen sensor 254 may include, for example, a recognition sheet that is a part of the touch panel or is separated from the touch panel. The key 256 may be, for example, a physical button, an optical key, and a keypad. The ultrasonic input unit 258 may sense an ultrasonic wave generated by an input means through a microphone (e.g., a microphone 288), and may confirm data corresponding to the sensed ultrasonic wave.

The display 260 (e.g., the display 160) may include a panel 262, a hologram unit 264, a projector 266, and/or a control circuit for controlling the same. The panel 262 may be implemented to be, for example, flexible, transparent, or wearable. The panel 262 together with the touch panel 252 may be implemented as one or more modules. According to an embodiment of the present disclosure, the panel 262 may include a pressure sensor (or a force sensor) capable of measuring the strength of pressure of a user's touch. The pressure sensor and the touch panel 252 may be integrated into one unit, or the pressure sensor may be implemented by one or more sensors separated from the touch panel 252. The hologram unit 264 may display a three-dimensional image in the air by using the interference of light. The projector 266 may display an image by projecting light onto a screen. The screen may be located, for example, inside or outside the electronic device 201. The interface 270 may include, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 150 illustrated in FIG. 1. The audio module 280 may process sound information which is input or output through, for example, a speaker 282, a receiver 284, an earphone 286, the microphone 288, or the like. The camera module 291 is, for example, a device capable of capturing a still image and a moving image. According to an embodiment of the present disclosure, the camera module 291 may include one or more image sensors (e.g., a front sensor or a back sensor), a lens, an Image Signal Processor (ISP), and a flash (e.g., an LED, a xenon lamp, or the like). The power management module 295 may manage, for example, power of the electronic device 201. According to an embodiment of the present disclosure, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and the like. The PMIC may further include additional circuits (e.g., a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include, for example, a mobile television (TV) support unit (e.g., a GPU) that may process media data according to a standard, such as Digital Multimedia Broadcasting (DMB), Digital Video Broadcasting (DVB), or mediaFLO™. Each of the above-described elements of hardware according to the present disclosure may include one or more components, and the names of the corresponding elements may vary based on the type of electronic device. In various embodiments of the present disclosure, the electronic device (e.g., the electronic device 201) may omit some elements or may further include additional elements, or some of the elements of the electronic device may be combined into one entity, which may perform functions identical to those of the relevant elements before the combination.

Figure 3:
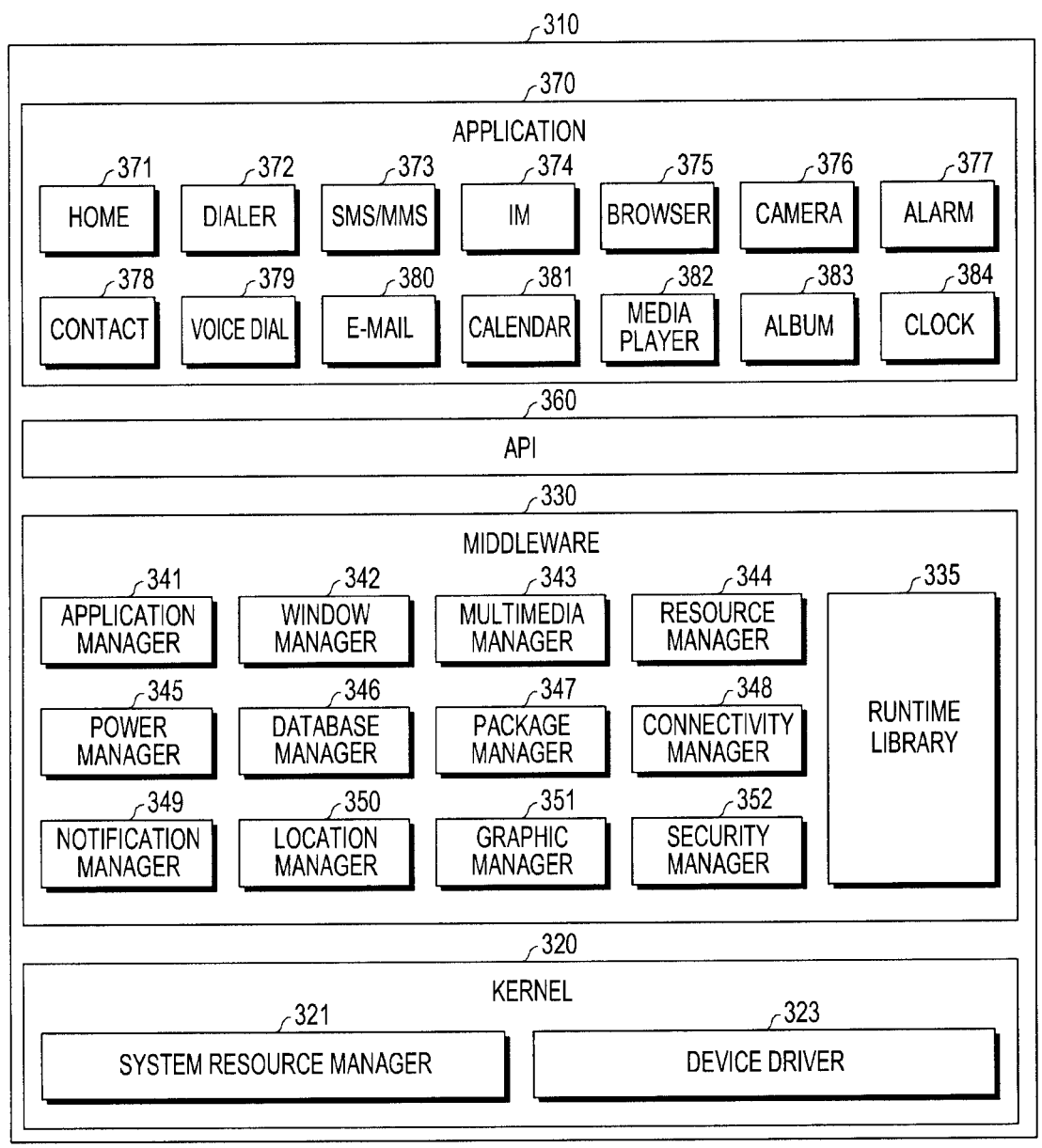
FIG. 3 is a block diagram illustrating a configuration of a program module according to various embodiments of the present disclosure.

FIG. 3 is a block diagram illustrating a configuration of a program module according to various embodiments of the present disclosure. According to an embodiment of the present disclosure, the program module 310 (e.g., the program 140) may include an OS for controlling resources related to the electronic device (e.g., the electronic device 101) and/or various applications (e.g., the application programs 147) executed in the OS. The OS may be, for example, Android™, iOS™, Windows™, Symbian™, Tizen™, Bada™, and the like. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least some of the program module 310 may be preloaded on the electronic device, or may be downloaded from an external electronic device (e.g., the electronic device 102 or 104, or the server 106).

The kernel 320 may include, for example, a system resource manager 321 and/or a device driver 323. The system resource manager 321 may control, allocate, or retrieve system resources. According to an embodiment of the present disclosure, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 330 may provide a function utilized in common by the applications 370, or may provide various functions to the applications 370 through the API 360 so as to enable the applications 370 to use the limited system resources within the electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may manage input/output, manage a memory, or process an arithmetic function. The application manager 341 may manage, for example, the life cycle of the application 370. The window manager 342 may manage Graphical User Interface (GUI) resources used for the screen. The multimedia manager 343 may determine formats utilized to reproduce media files, and may encode or decode a media file by using a coder/decoder (codec) appropriate for the relevant format. The resource manager 344 may manage a source code of the application 370 or a memory space for the application 370. For example, the power manager 345 may manage the capacity of a battery or power, and may provide power information utilized for an operation of the electronic device. According to an embodiment of the present disclosure, the power manager 345 may operate in conjunction with a Basic Input/Output System (BIOS). The database manager 346 may, for example, generate, search, or change a database to be used by the application 370. The package manager 347 may manage the installation or update of an application distributed in the form of a package file.

For example, the connectivity manager 348 may manage a wireless connection. The notification manager 349 may provide a user with an event, such as an arrival message, an appointment, a proximity notification, and the like. The location manager 350 may manage, for example, location information of the electronic device. For example, the graphic manager 351 may manage a graphic effect, which is to be provided to the user, or a user interface related to the graphic effect. The security manager 352 may provide, for example, system security or user authentication. According to an embodiment of the present disclosure, the middleware 330 may include a telephony manager for managing a voice call function or a video call function of the electronic device, or may include a middleware module capable of forming a combination of functions of the above-described elements. According to an embodiment of the present disclosure, the middleware 330 may provide a module specialized for each type of OS. The middleware 330 may dynamically delete some of the existing elements, or may add new elements. The API 360 is, for example, a set of API programming functions, and may be provided with a different configuration for each OS. For example, in the case of Android or iOS, one API set may be provided for each platform, and in the case of Tizen, two or more API sets may be provided for each platform.

The application 370 may include, for example, a home 371, a dialer 372, an SMS/MMS 373, an Instant Message (IM) 374, a browser 375, a camera 376, an alarm 377, a contact 378, a voice dialer 379, an email 380, a calendar 381, a media player 382, an album 383, a clock 384, health care (e.g., which measures an exercise quantity, a blood sugar level, or the like), and an application for providing environmental information (e.g., information on atmospheric pressure, humidity, or temperature). According to an embodiment of the present disclosure, the application 370 may include an information exchange application capable of supporting information exchange between the electronic device and an external electronic device. The information exchange application may include, for example, a notification relay application for delivering particular information to the external electronic device or a device management application for managing the external electronic device. For example, the notification relay application may deliver, to the external electronic device, notification information generated by the other applications of the electronic device, or may receive notification information from the external electronic device and may provide the received notification information to the user. The device management application may install, delete, or update, for example, a function (e.g., turning on/off the external electronic device itself (or some elements thereof) or adjusting the brightness (or resolution) of the display) of the external electronic device communicating with the electronic device, or an application executed in the external electronic device. According to an embodiment of the present disclosure, the application 370 may include an application (e.g., a health care application of a mobile medical device) designated according to an attribute of the external electronic device. According to an embodiment of the present disclosure, the application 370 may include an application received from the external electronic device. At least part of the program module 310 may be implemented (e.g., executed) in software, firmware, hardware (e.g., the processor 210), or at least two combinations thereof, and may include a module, a program, a routine, a set of instructions, or a process for performing one or more functions.

Figure 4:
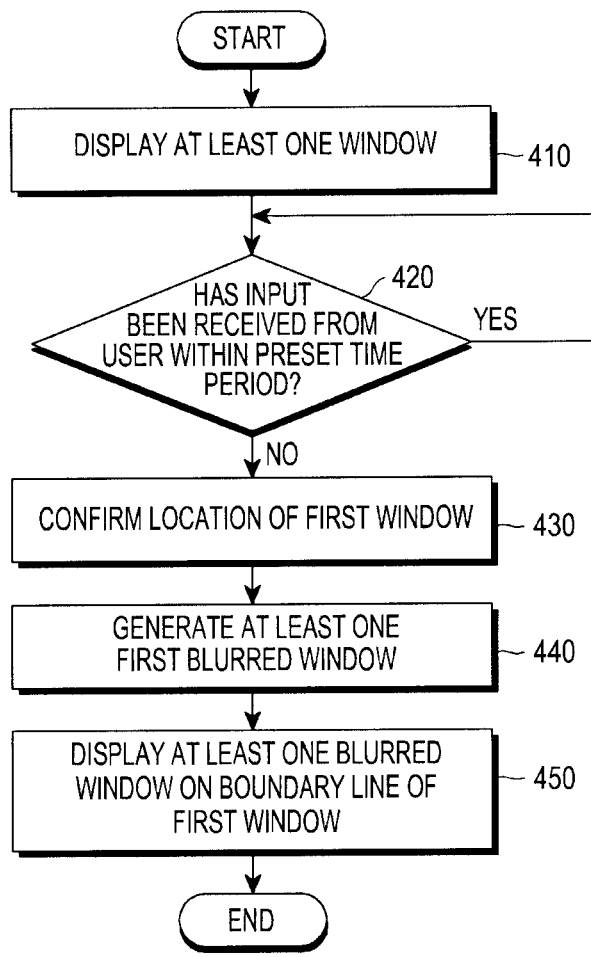
FIG. 4 is a flowchart illustrating a method for reducing burn-in caused by an electronic device according to various embodiments of the present disclosure.

FIG. 4 is a flowchart illustrating a method for reducing burn-in caused by operations of an electronic device according to various embodiments of the present disclosure.

In operation 410, the electronic device 101 may display at least one window.

In operation 420, the electronic device 101 may determine whether an input is received from a user within a preset time period. That is, before the electronic device 101 performs a method for reducing the occurrence of burn-in, in order to determine whether the user is using the electronic device 101, the electronic device 101 may determine whether the input has been received from the user within the preset or predetermined time period. However, it should be noted operation 420 may be omitted according to a configuration set by the user.

In operation 430, when the input has not been received from the user within the preset time period, the electronic device 101 may confirm a location of a first window selected by the user.

Figure 5:
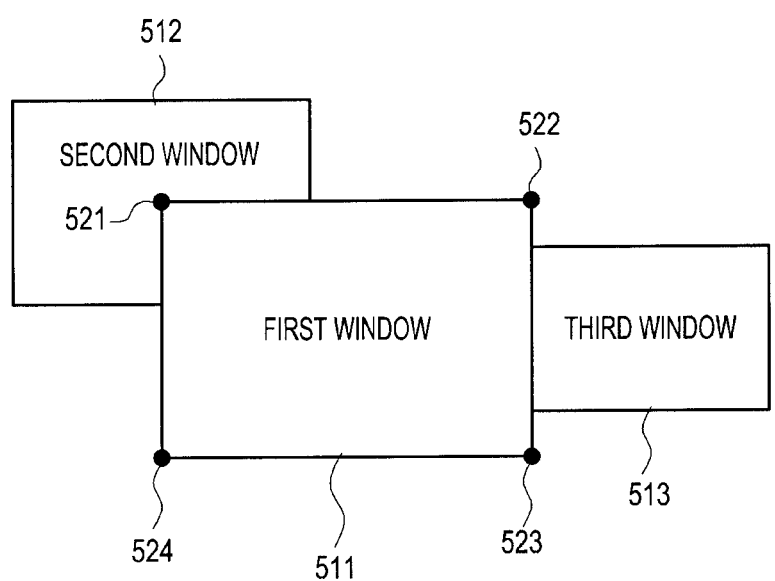
FIG. 5 is a view for explaining a method for confirming the location of a window according to various embodiments of the present disclosure.

For example, as illustrated in FIG. 5, the electronic device 101 may display a first window 511, a second window 512, and a third window 513. In FIG. 5, the first window 511 may be output in a higher layer than the second window 512 and the third window 513, while currently selected by the user. Accordingly, as illustrated in FIG. 5, the first window 511 may be displayed at a 'higher' layer, such that the first window 511 is displayed overlapping the second window 512 and/or the third window 513.

When the input has not been received from the user within the preset time period (as in FIG. 4, 420), the electronic device 101 may confirm the location of the first window 511 selected by the user (as in FIG. 4, 430). For example, the electronic device 101 may confirm coordinates of an upper-left vertex 521 of the first window 511, and may confirm coordinates of each of remaining vertices 522, 523, and 524 based on the confirmed coordinates of the upper-left 521. The electronic device 101 may confirm the location of the first window 511 based on the confirmed coordinates of each of the vertices 521, 522, 523, and 524 of the first window 511.

Also, based on the confirmed coordinates of each of the vertices 521, 522, 523, and 524 of the first window 511, the electronic device 101 may confirm the present and/or location of a boundary line of the first window 511, and also the overall shape of the first window 511.

Thus, returning to FIG. 4, in operation 440, the electronic device 101 may generate at least one first blurred window for displaying a blur-processed image, based on the location of the first window, which was confirmed in operation 430. The blurred window may thus be displayed along a boundary line of the first window, as seen in operation 450.

Hereinafter, for convenience of description, the description will focus on an embodiment in which at least one first blurred window is generated for a first window selected by a user, but embodiments of the present disclosure are not limited thereto. That is, blurred windows respectively corresponding to multiple windows displayed on the display 160 may be generated and displayed.

Figure 6A:
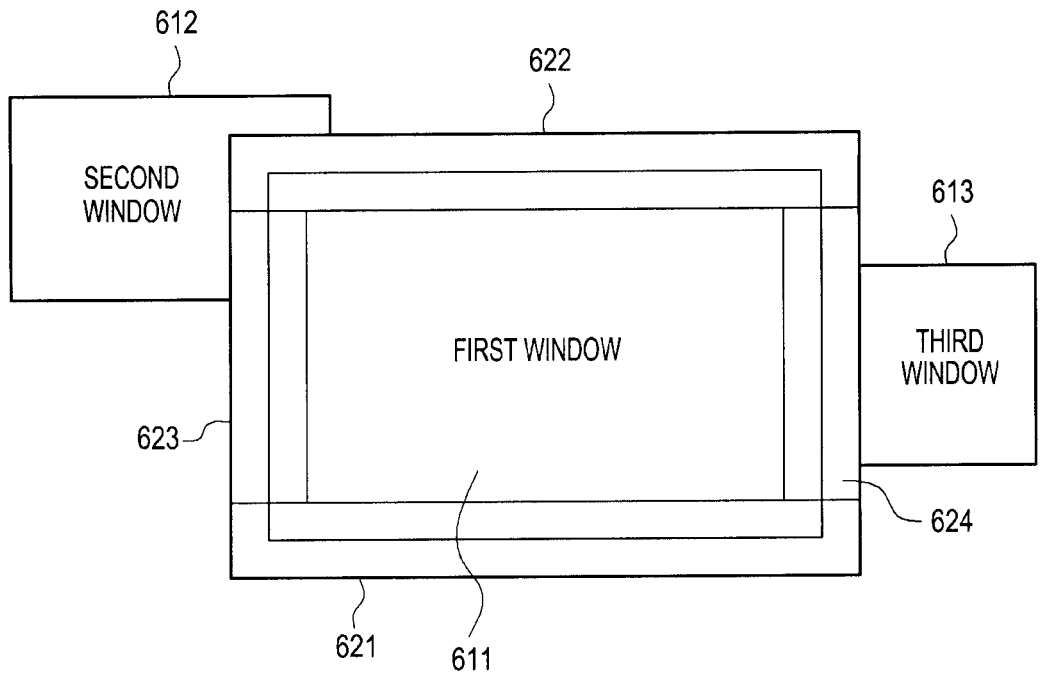
FIG. 6A and FIG. 6B are views for explaining a method for displaying a blurred window on a boundary line of a window according to various embodiments of the present disclosure.

For example, referring now to FIG. 6A, the electronic device 101 may generate multiple first blurred windows (e.g., window borders or boundaries) 621, 622, 623, and 624 for a first window 611 actively selected by a user from among the first window 611, the second window 612, and the third window 613. Four first blurred window borders may be generated to respectively correspond to different portions of a boundary line of the first window 611, as illustrated in FIG. 6A. Alternatively, although not illustrated, a single first blurred window border may be generated corresponding to the entire boundary border line (e.g., all four borders) of the window 611.

For example, when the first window 611 is quadrangular as illustrated in FIG. 6A, four first blurred window borders may be generated to respectively correspond to the sides of the first window 611. The blurred window border 621 may correspond to the bottom side of the first window 611, the blurred window border 622 may correspond to the top side of the first window 611, the blurred window border 623 may correspond to the left side of the first window 611, and the blurred window 624 border may correspond to the right side of the first window 611.

Also, the respective sizes of the multiple first blurred window borders may be determined to be identical according to a difference between a background screen and a screen displayed through the first window 611. Alternatively, the respective sizes of the first blurred window borders may be determined to be different. In this case, in a part where the first window 611 overlaps the second window 612 or the third window 613, a difference between a screen displayed through the first window 611 and a screen displayed through the second window 612 or a screen displayed through the third window 613 may be used to determine the size of a corresponding first blurred window border (e.g., the blurred window 623 or the blurred window 624).

Returning to FIG. 4, in operation 450, the electronic device 101 may display the at least one blurred window border, which has been generated in operation 440, on the boundary line of the first window.

Figure 6B:
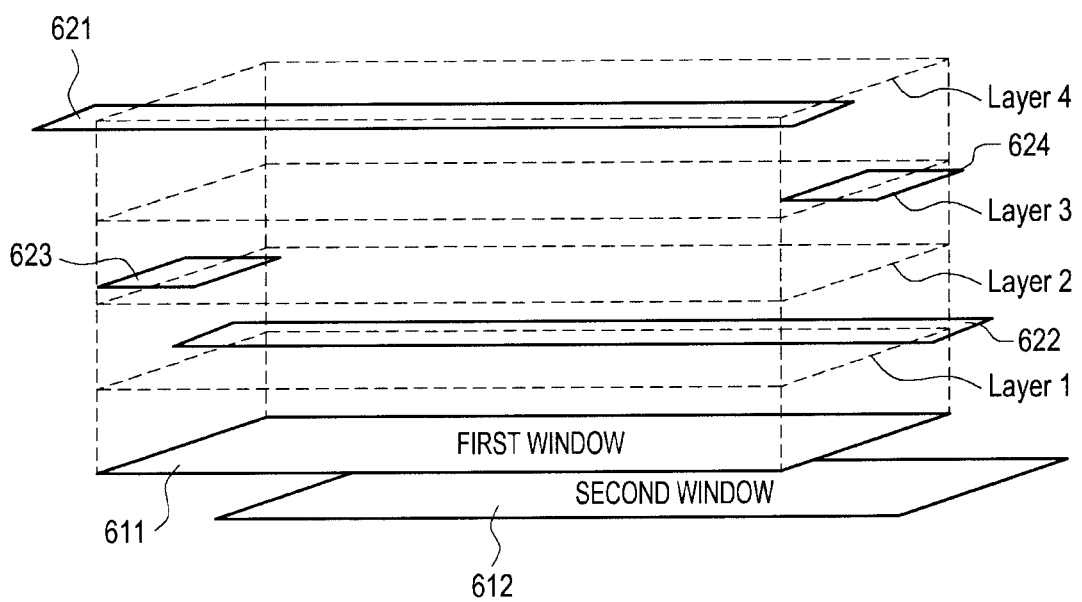

For example, referring to FIG. 6B, the electronic device 101 may divide an upper layer area of the first window 611 into a first layer, a second layer, a third layer, and a fourth layer, and may output four respective blurred windows generated in the divided layers. For example, the electronic device 101 may output the blurred window border 622 in the first layer, may output the blurred window border 623 in the second layer, may output the blurred window border 624 in the third layer, and may output the blurred window border 621 in the fourth layer.

Also, the first window 611 is a window selected by the user, and may be output in a higher layer than unselected windows (e.g., the second window 612 and the third window 613). Accordingly, since the multiple blurred windows 621, 622, 623, and 624 are also output in higher layers than the unselected windows (e.g., the second window 612 and the third window 613), the multiple blurred windows 621, 622, 623, and 624 may be displayed at higher locations than those of the unselected windows (e.g., the second window 612 and the third window 613).

Figure 7A:
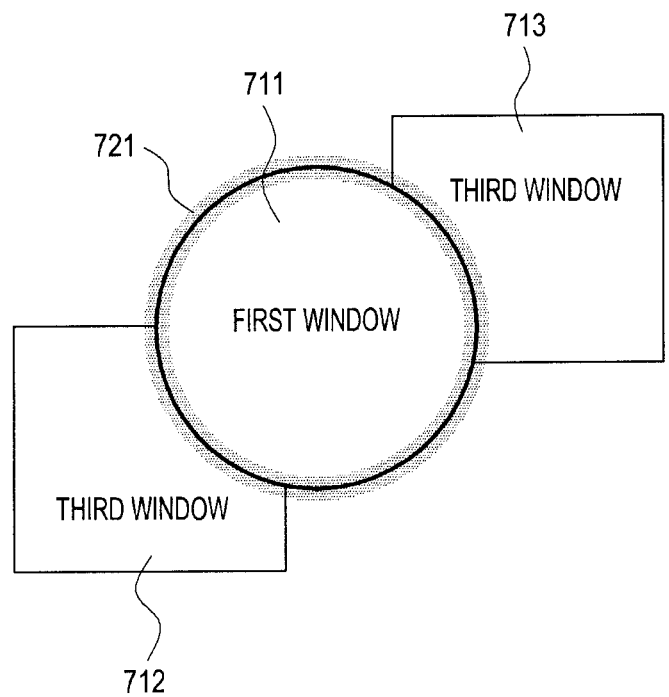
FIG. 7A and FIG. 7B are views illustrating blurred windows of various shapes according to various embodiments of the present disclosure.
Figure 7B:
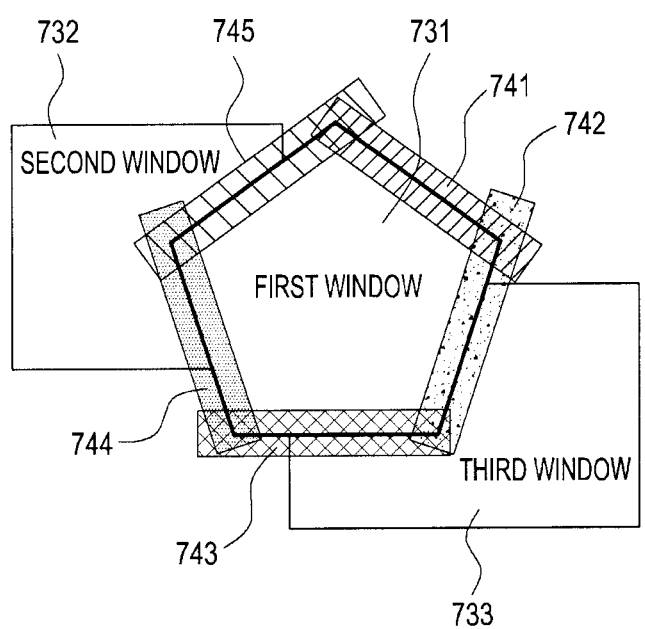

FIGS. 7A and 7B are views illustrating blurred windows of various shapes according to various embodiments of the present disclosure.

According to various embodiments of the present disclosure, the electronic device 101 may display multiple windows (a first window 711 or 731, a second window 712 or 732, and a third window 713 or 733), and may also confirm the shape of the first window 711 of FIG. 7A or 731 of FIG. 7B when confirming the location of the first window 711 or 731, as selected by a user.

For example, when the first window 711 is circular as illustrated in FIG. 7A, the electronic device 101 may detected coordinates of multiple optional points along a boundary line of the first window 711, and based on the detected coordinates of the multiple optional points may detect and confirm that the first window 711 is circular.

In another embodiment, when the first window 731 is pentagonal as illustrated in FIG. 7B, the electronic device 101 may confirm coordinates of each of five vertices of the boundary line of the first window 711, and based on the detected coordinates of the five vertices, may confirm that the first window 731 is pentagonal, according to the confirm coordinates of each of the five vertices.

It is understood this configuration is illustrative, and the electronic device 101 may confirm the shape of the first window using other diverse methods.

The electronic device 101 may generate at least one first blurred window which corresponds to the confirmed shape of the first window, to display the at least one first blurred window along or over the boundary line of the first window.

For example, when the first window 711 is circular as illustrated in FIG. 7A, the electronic device 101 may generate one first blurred window 721 of a circular shape, and may display the generated first blurred window 721 along the boundary line of the first window 711.

When the first window 731 is pentagonal as illustrated in FIG. 7B, the electronic device 101 may generate five blurred window borders 741, 742, 743, 744, and 745 respectively corresponding to the sides of the pentagon, and may display the generated five blurred window borders 741, 742, 743, 744, and 745 on corresponding portions of the boundary line of the first window 731. In alternative embodiments, although not illustrated, the electronic device 101 may also generate a single blurred window border that corresponds to all five of the respective sides of the pentagon.

Figure 8A:
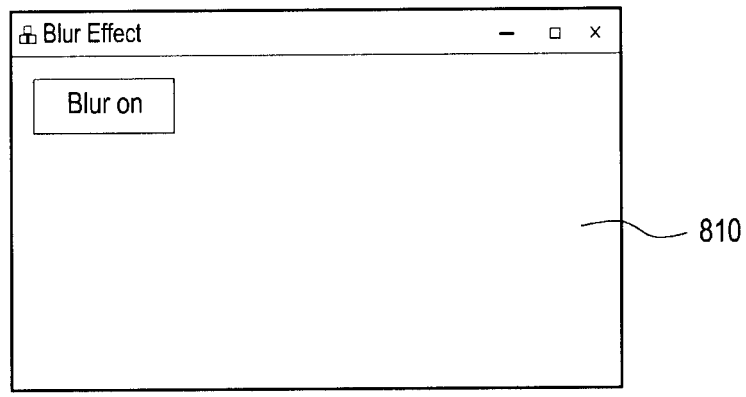
FIG. 8A is a view illustrating a window displayed by an electronic device according to one example embodiment.

FIG. 8A is a view illustrating a window displayed by an electronic device according to one example embodiment.

According to one example embodiment, the electronic device may display a window 810 without any change, as illustrated in FIG. 8A (i.e., without displaying a blurred window for displaying a blur-processed image). In this case, a sharp contrast exists in a color or brightness difference between the window 810 and a background screen, resulting in a risk of burn-in for the display 160.

Figure 8B:
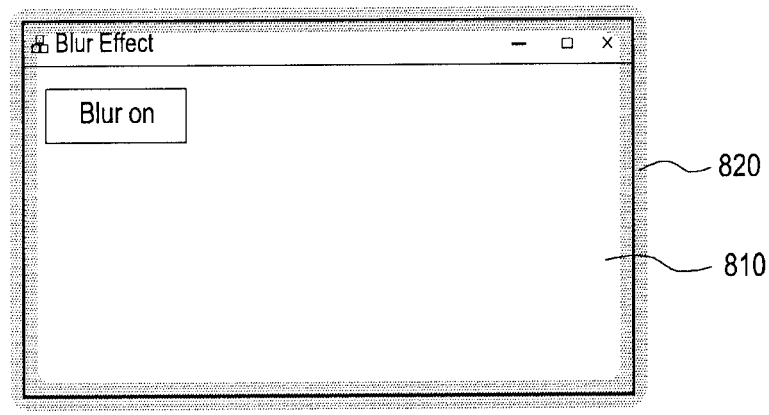
FIG. 8B and FIG. 8C are views illustrating a window and a blurred window displayed by an electronic device according to various embodiments of the present disclosure.
Figure 8C:
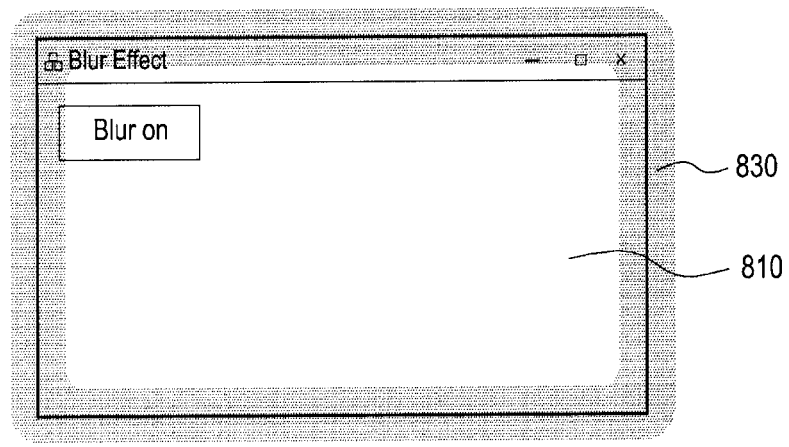

FIGS. 8B and 8C are views illustrating a window and a blurred window displayed by an electronic device according to various embodiments of the present disclosure.

According to various embodiments of the present disclosure, in order to reduce the risk of burn-in for the display 160, the electronic device 101 may display blurred windows 820 and 830 including a blur-processed image on the window 810 and a boundary line of the window 810, as illustrated in FIGS. 8B and 8C, respectively.

Also, the electronic device 101 may adjust the size (e.g., thickness) of the at least one blurred window 820 or 830 generated, according to a visual difference between a background screen (e.g., a desktop) and a screen displayed within the window 810 (e.g., any visual display within the window). For example, the larger the visual difference between the background screen and the screen displayed within the window 810 is, the thicker the pixels of the blurred window may be generated.

For example, as illustrated in FIG. 8B, the electronic device 101 may generate and display a blurred window 820 having a size of four pixels, utilizing a boundary line of the window 810 as a center, based on a visual difference between a background screen and a screen displayed through the window 810.

Alternatively, as illustrated in FIG. 8C, the electronic device 101 may generate and display the blurred window 830 having a size of 20 pixels with the boundary line of the window 810 within a center, based on the visual difference between the background screen and the screen displayed through the window 810.

As described above, the size of the blurred window 820 may be narrower than the size of the blurred window 830 if the visual difference in FIG. 8B is smaller than the visual difference in FIG. 8C. And, the electronic device 101 may adjust the size of at least one blurred window generated according to a difference between a background screen and a screen displayed through the window 810, and thereby can reduce risk of burn-in on the display 160.

Figure 9:
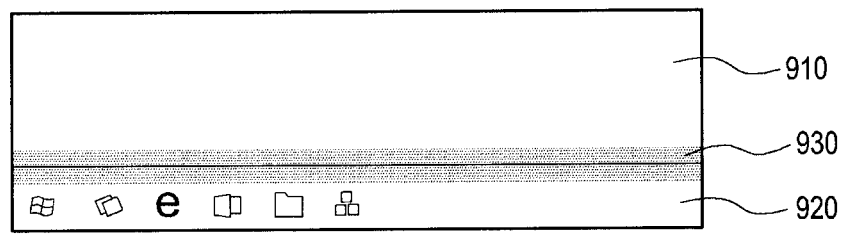
FIG. 9 is a view illustrating a blurred window displayed on a boundary line between a task bar and a window according to various embodiments of the present disclosure.

FIG. 9 is a view illustrating a blurred window displayed on a boundary line between a task bar and a window according to various embodiments of the present disclosure.

According to various embodiments of the present disclosure, when a window 910 selected by a user is displayed on a full screen, the electronic device 101 may display a blurred window 930 along a boundary line between the window 910 and the task bar 920. In some embodiments, although not illustrated herein, even when the window 910 is not displayed on the full screen, if the window 910 contacts or overlaps the task bar 920, the electronic device 101 may display the blurred window 930 on the boundary line between the window 910 and the task bar 920. Therefore, the risk of burn-in on the display 160 can be reduced, this particular form occurring because of a continuous display of the task bar 920.

Figure 10A:
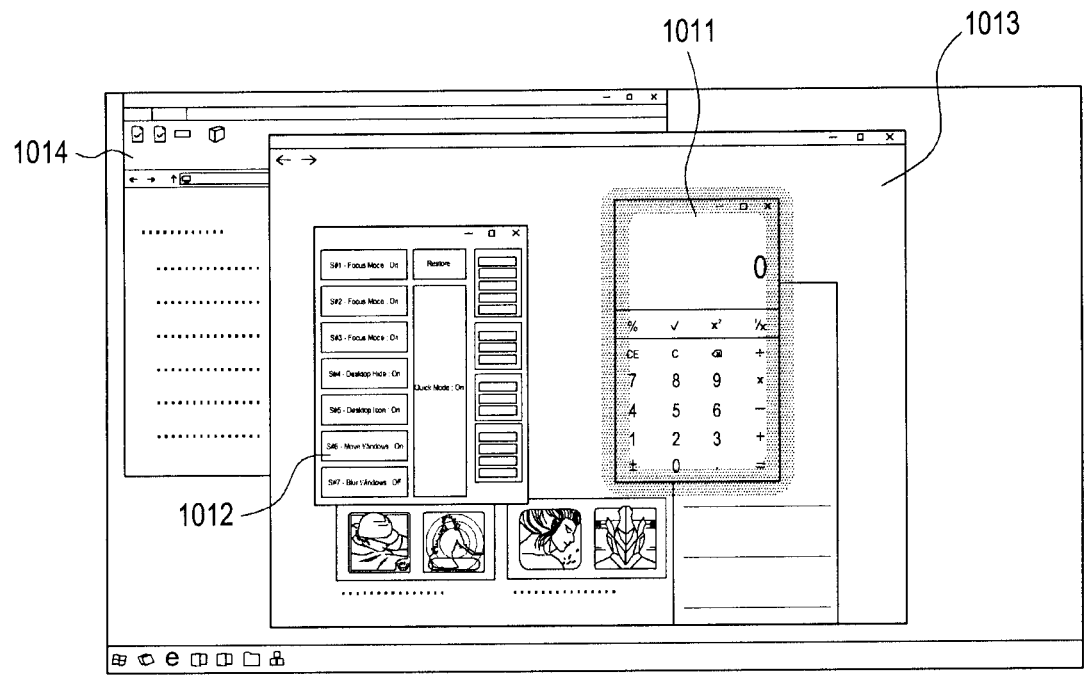
FIG. 10A and FIG. 10B are views illustrating a method for changing a window on which a blurred window is displayed, according to various embodiments of the present disclosure.
Figure 10B:
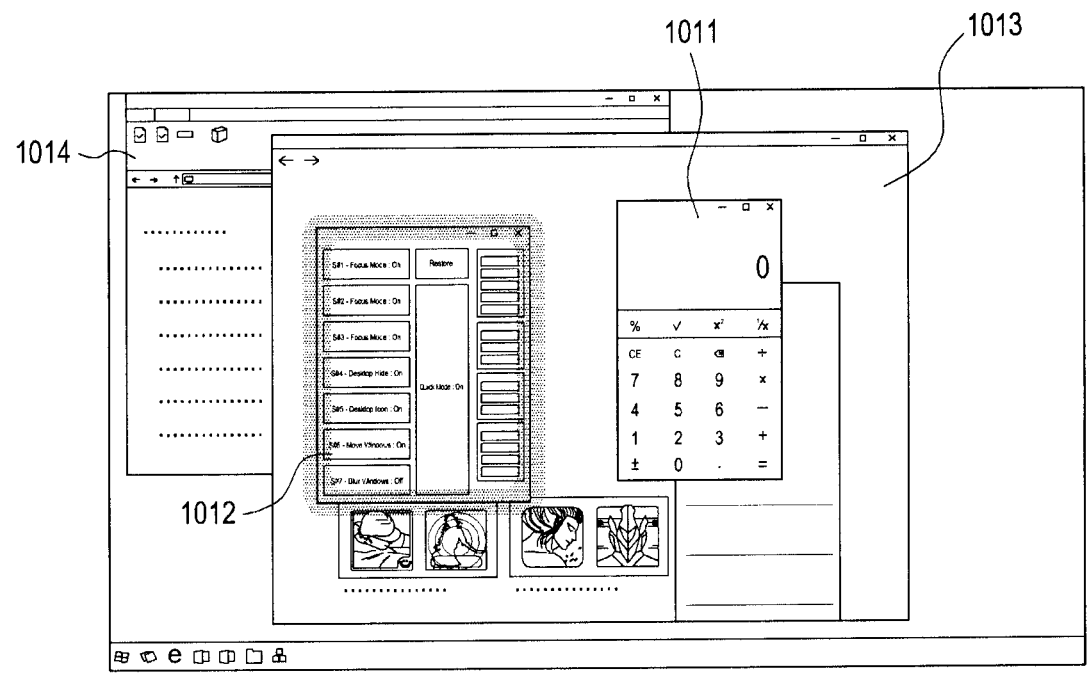
Figure 11A:
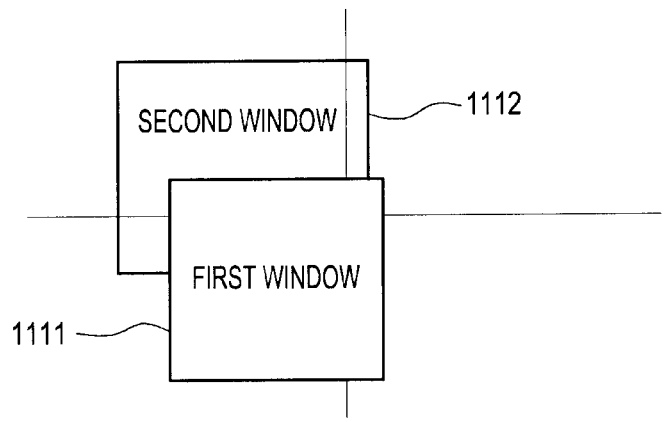
FIG. 11A, FIG. 11B, FIG. 11C, FIG. 11D, FIG. 12A, FIG. 12B, FIG. 12C, FIG. 12D and 13 are views for explaining the location movement of at least one window according to various embodiments of the present disclosure.
Figure 11B:
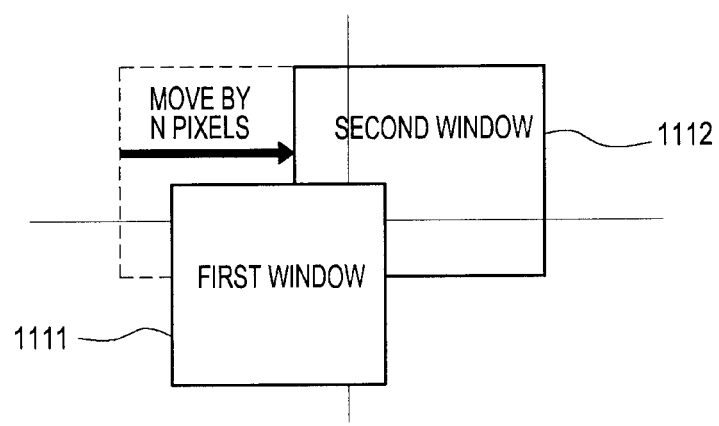
Figure 11C:
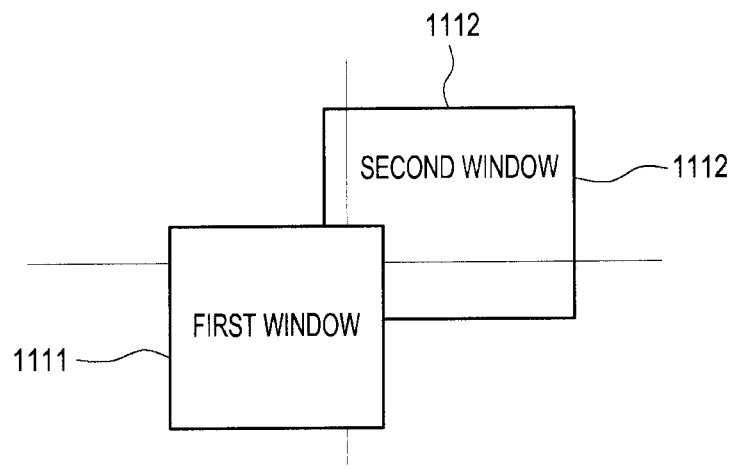
Figure 11D:
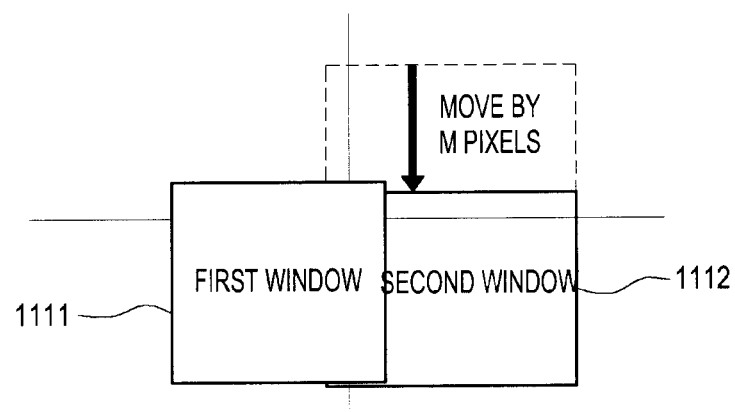
Figure 12A:
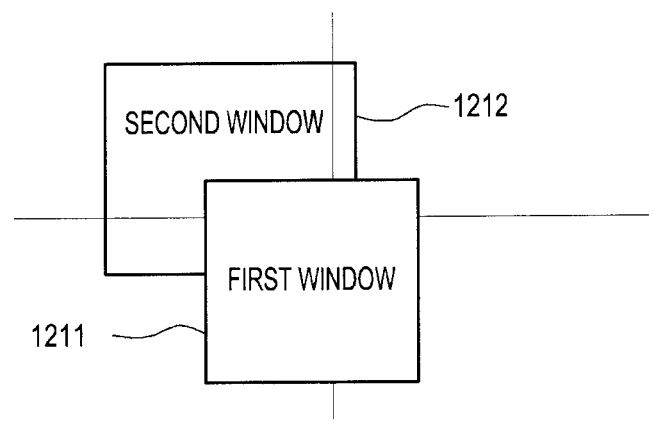
Figure 12B:
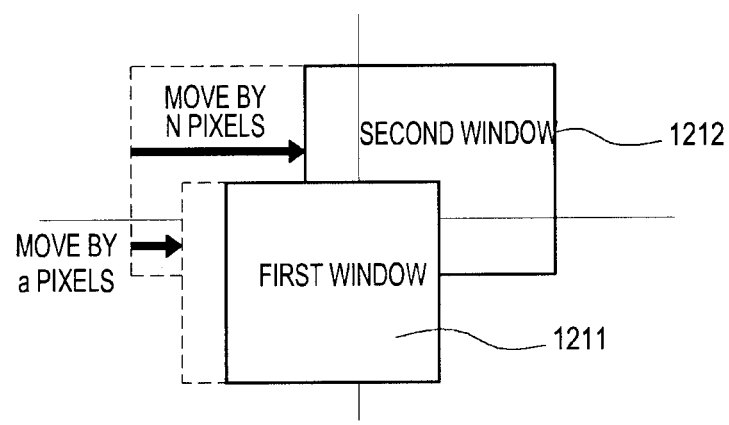
Figure 12C:
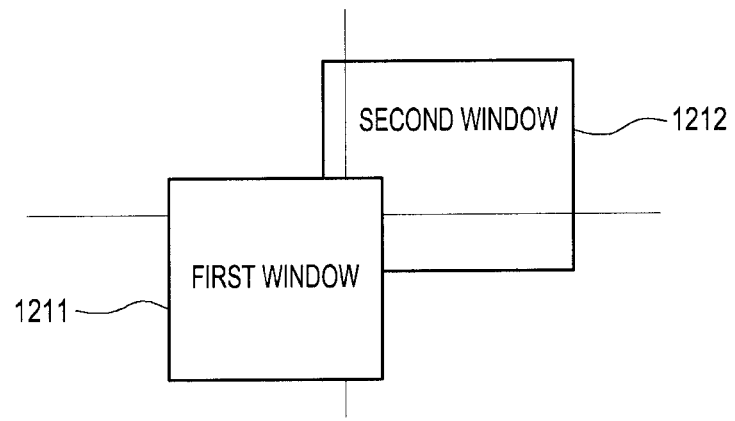
Figure 12D:
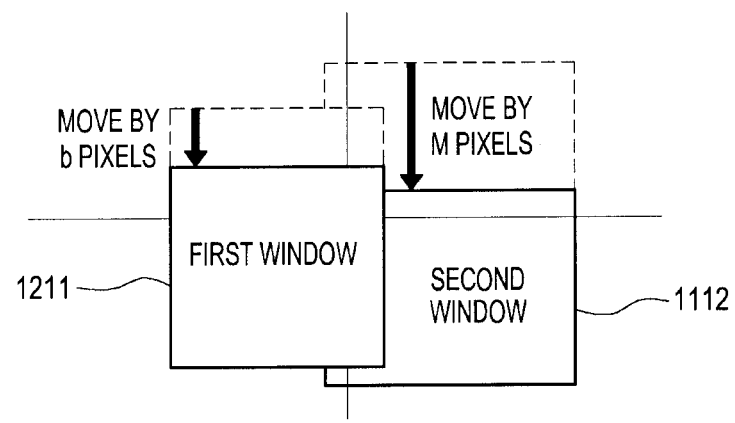

FIGS. 10A and 10B are views illustrating a method for changing a window on which a blurred window is displayed, according to various embodiments of the present disclosure.

According to various embodiments of the present disclosure, the electronic device 101 may generate a blurred window for a window selected by the user, and may display the blurred window on a boundary line of the window, whereas unselected windows are displayed normally without blurring. Alternatively, in some embodiments, although not illustrated, the electronic device 101 may generate and display blurred windows for all of the displayed windows.

For example, as illustrated in FIG. 10A, the electronic device 101 may display a first window 1011, a second window 1012, a third window 1013, and a fourth window 1014 on the display 160. In FIG. 10A, the first window 1011 is selected by the user. Accordingly, the electronic device 101 may generate a blurred window for the first window 1011, and may display the blurred window on a boundary line of the first window 1011, whereas windows 1012, 1013 and 1014 are displayed without blurring.

The user selection may change from the first window 1011 to the second window 1012, as illustrated in FIG. 10B. In this case, the electronic device 101 may generate a blurred window for the second window 1012, and may display the blurred window on a boundary line of the second window 1012. Accordingly, the blurred window displayed on the boundary line of the first window 1011 may be removed, reverting the first window 1011 to a normal display, as illustrated in FIG. 10B.

Figure 13:
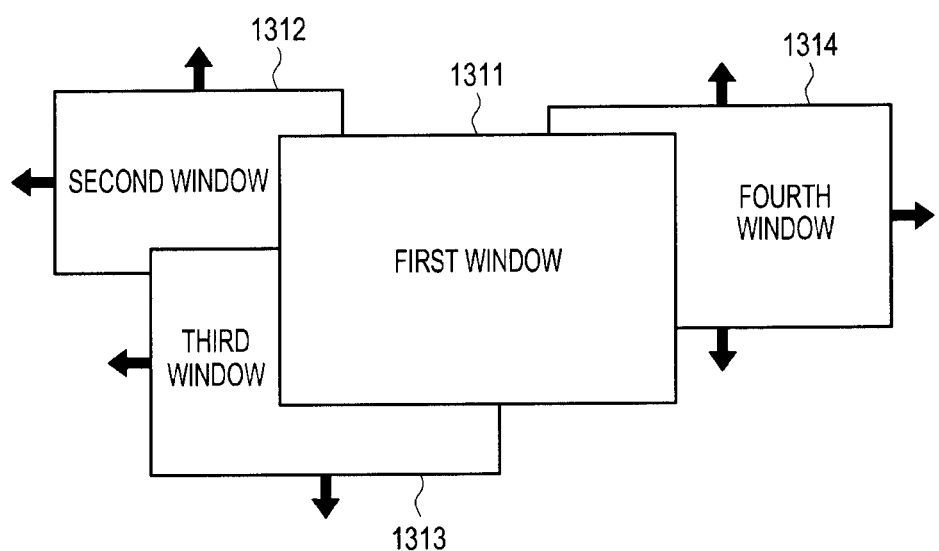

FIGS. 11 to 13 are views for explaining the location movement of at least one window according to various embodiments of the present disclosure.

According to various embodiments of the present disclosure, the electronic device 101 may move the location of at least one window displayed on the display 160 in order to reduce burn-in on the display 160.

For example, when a user has selected a first window 1111, the electronic device 101 may fix the location of a first window 1111 and may move a second window 1112 which is not presently selected by the user.

As illustrated in (a) of FIG. 11, the electronic device 101 may display the first window 1111, which has been selected by the user, at a higher layer than that of the second window 1112 (e.g., as to overlap the second window 1112). As illustrated in (b) of FIG. 11, when a preset cycle comes, the electronic device 101 may move the second window 1112 by a number 'N' pixels in a rightwards direction. Accordingly, as illustrated in (c) of FIG. 11, after the second window 1112 is moved by N pixels in the rightward direction, and may be displayed at a new location. Thereafter, after completion of a preset cycle, such as the expiry of a predetermined time period, the electronic device 101 may again move the second window 1112 by a distance 'M' pixels, in the downward direction as illustrated in (d) of FIG. 11. The specific movement directions and movement distances of the second window 1112, and a location movement cycle (i.e., the predetermined time period for expiry) may be variously set according to a default configuration or a configuration set in advance by the user.

In various embodiments, the electronic device 101 may move the location of a first window 1211 selected by the user, and that of a second window 1212 which has not been selected by the user.

As illustrated in (a) of FIG. 12, the electronic device 101 may display the first window 1211, which has been selected by the user, at a higher layer than that of the second window 1212. As illustrated in (b) of FIG. 12, when the preset cycle arrives (e.g., when a predetermined time period expires), the electronic device 101 may move the first window 1211 and the second window 1212 in a rightward direction. As illustrated in (b) of FIG. 12, the electronic device 101 may move the first window 1211 by "a" pixels, and may move the second window 1212 by 'N' pixels. As illustrated in (b) of FIG. 12, the electronic device 101 may move the first window 1211, which has been selected by the user, by a shorter movement distance than that of the second window 1212. However, this configuration is an example for illustrative purposes only, and thus, embodiments of the present disclosure are not limited thereto. Further, in alternative embodiments, although not illustrated, the electronic device 101 may move the first window 1211 and the second window 1212 by an identical movement distance.

As illustrated in (c) of FIG. 12, the first window 1211 has been moved by "a" pixels in the rightward direction, and may be displayed at a location moved by "a" pixels in the rightward direction, and the second window 1212 may be moved by 'N' pixels in the rightward direction and may be displayed at a location moved by 'N' pixels in the rightward direction. Thereafter, when a preset cycle comes (e.g., after expiry of the predetermined time period), as illustrated in (d) of FIG. 12, the electronic device 101 may move the first window 1211 by 'b' pixels in the downward direction, and may move the second window 1212 by 'M' pixels in the downward direction. As illustrated in (d) of FIG. 12, the electronic device 101 may move the first window 1211, which has been selected by the user, by a shorter movement distance than that of the second window 1212. However, this configuration is an example for illustrative purposes only, and thus, embodiments of the present disclosure are not limited thereto. Also, in some other embodiments, although not illustrated, the electronic device 101 may move the first window 1211 and the second window 1212 by an identical movement distance.

Also, as illustrated in FIG. 13, the electronic device 101 may move a second window 1312, a third window 1313, and a fourth window 1314, which have not been selected by the user, in different movement directions and by different movement distances in a preset cycle with a first window 1311 selected by the user as a center.

Further, when the window selected by a user input is changed from the first window 1311 to the second window 1312, the electronic device 101 may move the first window 1311, the third window 1313, and the fourth window 1314 in different movement directions and by different movement distances according to a preset cycle with the newly-selected second window 1312 as a center.

Figure 14:
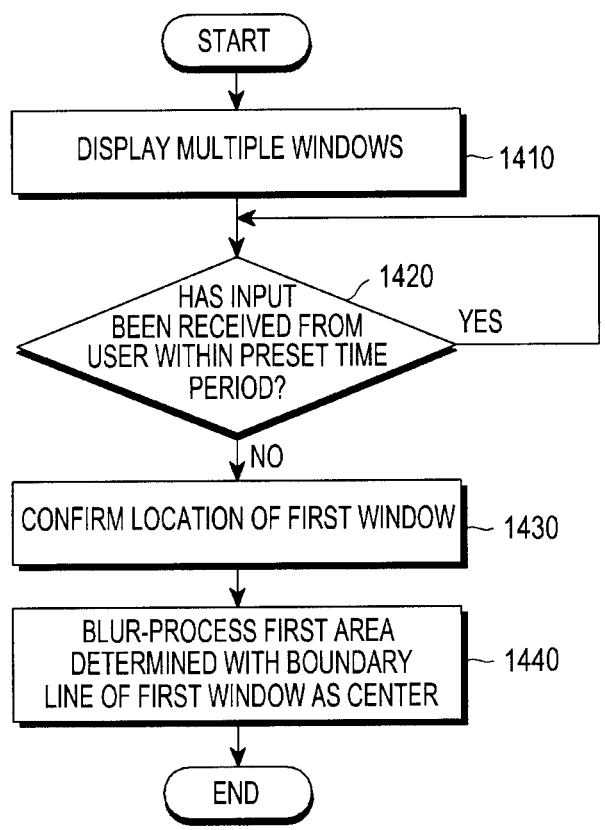
FIG. 14 is a flowchart illustrating a method for reducing burn-in caused by an electronic device according to various embodiments of the present disclosure.

FIG. 14 is a flowchart illustrating a method for reducing burn-in caused by an electronic device according to various embodiments of the present disclosure.

In operation 1410, the electronic device 101 may display multiple windows.

In operation 1420, the electronic device 101 may determine whether an input has been received from a user within a preset time period. That is, before the electronic device 101 performs a method for reducing the occurrence of burn-in, the processor 120 may determine whether an input has been received from the user within a preset time period in order to determine whether the user is actively using the electronic device 101.

In operation 1430, when the input has not been received from the user within the preset time period, the electronic device 101 may confirm the location of a first window selected by the user.

In operation 1440, the electronic device 101 may blur-process a first area along a boundary line of the first window. The boundary line of the first area may be confirmed according to a detected location of the first window which serves as a center of the boundary.

For example, the electronic device 101 may determine the first area to be blur-processed, based on a difference between a background screen and a screen displayed through the first window. The electronic device 101 may directly blur-process the first area without a separate blurred-window generation process, or may generate at least one first blurred window for displaying a blur-processed image so as to correspond to the first area. The electronic device 101 may display the generated at least one first blurred window so as to overlap the first window on the first window in the first area. A method for generating and displaying the at least one first blurred window is identical to the above-described method, and thus, a separate description thereof will be omitted. Through this configuration, the electronic device 101 may reduce burn-in on the display 160.

Each of the above-described elements of hardware according to the present disclosure may include one or more components, and the names of the corresponding elements may vary based on the type of electronic device. According to various embodiments of the present disclosure, the electronic device may include at least one of the elements described in the present disclosure. Some elements may be omitted from the electronic device or other additional elements may be further included therein. Also, some of the elements of the electronic device according to various embodiments of the present disclosure may be combined into one entity, which may perform functions identical to those of the relevant elements before the combination.

The term "module" as used herein may include a unit implemented in hardware, software, or firmware, and for example, may be used interchangeably with the term "logic", "logical block", "component", "circuit", or the like. The "module" may be an integrated component, or a minimum unit for performing one or more functions or a part thereof. The "module" may be mechanically or electronically implemented, and may include, for example, an Application-Specific Integrated Circuit (ASIC) chip, a Field-Programmable Gate Array (FPGA), or a programmable logic device which performs certain operations and has been known or is to be developed in the future.

At least part of the device (e.g., modules or functions thereof) or the method (e.g., operations) according to various embodiments of the present disclosure may be implemented by an instruction which is stored in a computer-readable storage medium (e.g., the memory 130) in the form of a program module. When the instruction is executed by a processor (e.g., the processor 120), the processor may perform a function corresponding to the instruction.

Examples of the computer-readable recoding medium may include magnetic media, such as a hard disk, a floppy disk, and a magnetic tape; optical media, such as a Compact Disc Read Only Memory (CD-ROM) and a Digital Versatile Disc (DVD); magneto-optical media, such as a floptical disk; an internal memory; and the like. The instructions may include codes made by a compiler or codes which can be executed by an interpreter. The module or program module according to various embodiments of the present disclosure may include at least one of the aforementioned elements, may further include other elements, or some of the aforementioned elements may be omitted. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In the description below, an electronic device may include various electronic devices such as a portable terminal, a mobile communication terminal, a smart phone, a Personal Digital Assistant (PDA), a laptop computer, a desktop Personal Computer (PC), a tablet, a phablet, a navigation, a notebook, and any type of wearable communication device, such as electronic goggles, body-borne computer, or wearable smartphone or micro-tablet, etc. Also, the external device includes all electronic devices that can display an image such as a portable terminal, a mobile communication terminal, a smart phone, a PDA, a laptop computer, a desktop PC, a tablet PC, a navigation, a notebook, a Television (TV), etc.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

According to various embodiments of the present disclosure, in a non-transitory computer-readable recording medium for recording a program executed by a computer, the program may include executable instructions that, when executed by a processor, may cause the processor to perform operations including: confirming a location of a first window selected by a user from among at least one window displayed on a background screen; generating at least one first blurred window for displaying a blur-processed image, based on the location of the first window; and displaying the at least one first blurred window on a boundary line of the first window.

Example embodiments of the present disclosure are provided to describe technical contents of the present disclosure and to help the understanding of the present disclosure, and do not limit the present disclosure. Therefore, the present disclosure should be construed as including all modifications or various other embodiments which are based on the technical idea of the present disclosure.

What is claimed is:
1. An electronic device, comprising:
a display; and
a processor operatively coupled to the display, configured to:
control the display to display one or more windows on a background screen, wherein the one or more windows include a first window and a second window, and at least a part of the first window is displayed on the second window,
identify a location of the first window selected by a user,
control the display to display a first blurred window border along a boundary of the first window, and
move the second window not selected by the user according to a preset cycle while the location of the first window is maintained.
2. The electronic device as claimed in claim 1, wherein the processor is further configured to:
identify the location of the first window and control the display to display the first blurred window border along the boundary of the first window when an input is not detected within a preset time period after the first window is selected.
3. The electronic device as claimed in claim 1, wherein a line designating the boundary of the first window is identified based on the location of the first window, and the first blurred window border is displayed to correspond to the line designating the boundary of the first window.
4. The electronic device as claimed in claim 1, wherein the first blurred window border is displayed with a size that is based on a visual difference between the background screen, and a screen displayed within the first window.
5. The electronic device as claimed in claim 1, wherein the first blurred window border is blurred according to a blurring level selected based on a visual difference between the background screen, and a screen displayed within the first window.
6. The electronic device as claimed in claim 1, wherein the displayed first blurred window border is removed in response to detecting an input by the user after the displaying of the first blurred window border.
7. The electronic device as claimed in claim 1, wherein the processor is further configured to:
detecting whether a predetermined time is lapsed after displaying the first blurred window border and moving the second window,
when the predetermined time is lapsed, moving the first window and the first blurred window border to a new location, and
after moving the first window, restarting countdown of the predetermined time.

8. The electronic device as claimed in claim 1, wherein the processor is further configured to:
- identify a location of the second window when the second window is selected by the user after moving the second window, and
- control the display to display a second blurred window border along a boundary of the second window.

9. The electronic device as claimed in claim 8, wherein the processor is further configured to:
- remove the first blurred window border along the boundary of the first window, and
- move the first window to a new location according to the preset cycle.

10. A non-transitory computer-readable recording medium for recording a program executed by a computer, the program comprising executable instructions that, when executed by a processor, cause the processor to perform operations comprising:
- controlling a display of an electronic device to display one or more windows on a background screen, wherein the one or more windows include a first window and a second window and at least a part of the first window is displayed on the second window,
- identifying, by a processor of the electronic device, a location of the first window selected by a user,
- controlling the display to display a first blurred window border along a boundary of the first window, and
- moving the second window not selected by the user according to a preset cycle while the location of the first window is maintained.

11. The non-transitory computer-readable recording medium as claimed in claim 10, wherein the executable instructions cause the processor to further perform:
- identifying the location of the first window, and
- controlling the display to display the first blurred window border along the boundary of the first window when an input is not detected within a preset time period after the first window is selected.

12. The non-transitory computer-readable recording medium as claimed in claim 10, wherein the executable instructions cause the processor to further perform:
- identifying a line designating the boundary of the first window based on the location of the first window, and
- controlling the display to display the first blurred window border to correspond to the line designating the boundary of the first window.

13. The non-transitory computer-readable recording medium as claimed in claim 10, wherein the first blurred window border is generated with a size that is based on a visual difference between the background screen, and a screen displayed within the first window.

14. The non-transitory computer-readable recording medium as claimed in claim 10, wherein the executable instructions cause the processor to further perform:
- removing the at least one first blurred window on the boundary of the first window when an input by the user is detected.

15. The non-transitory computer-readable recording medium as claimed in claim 10, wherein the executable instructions cause the processor to further perform:
- identifying a location of the second window when the second window is selected by the user after moving the second window, and
- controlling the display to display a second blurred window border along a boundary of the second window.

16. The non-transitory computer-readable recording medium as claimed in claim 15, wherein the executable instructions cause the processor to further perform:
- removing the first blurred window border along the boundary of the first window, and
- moving the first window to a new location according to the preset cycle.

17. An electronic device, comprising:
- a display; and
- a processor operatively coupled to the display, configured to:
  - control the display to display multiple windows on a background screen, wherein the multiple windows include a first window and a second window and at least a part of the first window is displayed on the second window,
  - identify a location of the first window selected by a user input,
  - apply blur-processing to a first area including a line designating a boundary of the first window, the boundary identified according to a location of the first window, and
  - move the second window not selected by the user input according to a preset cycle while the location of the first window is maintained.

18. The electronic device as claimed in claim 17, wherein the processor is further configured to:
- detect the first area based on detecting a visual difference between the background screen and a screen displayed within the first window, and
- control the display to display at least one first blurred window border overlapping the first window within in the detected first area.

* * * * *